(12) United States Patent
Omi

(10) Patent No.: US 7,630,901 B2
(45) Date of Patent: Dec. 8, 2009

(54) MULTIMODAL INPUT METHOD

(75) Inventor: Hiromi Omi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 11/152,626

(22) Filed: Jun. 14, 2005

(65) Prior Publication Data

US 2005/0288934 A1  Dec. 29, 2005

(30) Foreign Application Priority Data

Jun. 29, 2004  (JP) ............................. 2004-191632
Dec. 28, 2004  (JP) ............................. 2004-379948

(51) Int. Cl.
*G10L 21/00* (2006.01)

(52) U.S. Cl. .................... 704/275; 704/270.1; 704/270; 704/258; 704/257; 704/260; 715/863; 715/866; 710/65

(58) Field of Classification Search ................. 704/275, 704/260, 270.1, 258, 251, 231.9, 257, E15.026, 704/E15.041, E13.011, E15.044; 715/863, 715/866; 710/1, 65
See application file for complete search history.

(56) References Cited

U.S. PATENT DOCUMENTS

| 5,781,179 | A | * | 7/1998 | Nakajima et al. | ........... 345/157 |
| 5,884,249 | A |  | 3/1999 | Namba | |
| 6,523,061 | B1 | * | 2/2003 | Halverson et al. | ........... 709/202 |
| 7,272,556 | B1 | * | 9/2007 | Aguilar et al. | ............... 704/230 |
| 2002/0135614 | A1 | * | 9/2002 | Bennett | ...................... 345/745 |
| 2003/0115060 | A1 | * | 6/2003 | Junqua et al. | ............... 704/235 |
| 2004/0031058 | A1 | * | 2/2004 | Reisman | ..................... 725/112 |
| 2004/0117513 | A1 | * | 6/2004 | Scott | ............................. 710/1 |
| 2005/0010892 | A1 | * | 1/2005 | McNair et al. | ............... 717/101 |
| 2005/0165601 | A1 | * | 7/2005 | Gupta et al. | .................... 704/9 |

FOREIGN PATENT DOCUMENTS

| JP | 6-282569 | A | 10/1994 |
| JP | 7-110734 | A | 4/1995 |
| JP | 8-234789 | A | 9/1996 |
| JP | 8-263258 | A | 10/1996 |
| JP | 8-28688 | A | 11/1996 |
| JP | 9-81364 | A | 3/1997 |
| JP | 9-114634 | A | 5/1997 |
| JP | 10-198544 | A | 7/1998 |
| JP | 11-288342 | A | 10/1999 |
| JP | 2000-231427 | A | 8/2000 |
| JP | 2001-100878 | A | 4/2001 |

* cited by examiner

*Primary Examiner*—Vijay B Chawan
(74) *Attorney, Agent, or Firm*—Canon U.S.A. Inc., I.P. Division (57) ABSTRACT

In a multimodal input method, input information input from at least two input sources is received, control of the recognition of input from a second input source is performed based on the number of inputs from a first input source, and a recognition result is output.

7 Claims, 11 Drawing Sheets

MULTIMODAL INPUT METHOD

BACKGROUND OF THE INVENTION

1. Field of the Invention

The present invention relates to a technique for a multimodal user interface.

2. Description of the Related Art

A multimodal user interface is convenient in that it provides the user with a plurality of input sources, such as graphical user interface (GUI) input and speech input, to enable the user to input information by a desired input source. The multimodal user interface is particularly convenient when a plurality of input sources are simultaneously used. For example, by saying "Move this to here" while clicking on items corresponding to "this" and "here" on a GUI, the user can freely control the items even if he/she is unfamiliar with technical terms, such as commands. To allow such an operation to take place, inputs from a plurality of input sources need to be integrated.

Examples of methods for integrating inputs from a plurality of input sources include a method in which information related to the type and speed of a mouse event is used (see Japanese Patent Laid-Open No. 8-286887 and Japanese Patent Laid-Open No. 9-81364 (corresponding U.S. Pat. No. 5,781,179)), a method in which a linguistic analysis is performed on the result of speech recognition (see Japanese Patent No. 2993872), a method using context information (see Japanese Patent No. 3375449), a method in which some recognition results whose input times are close to each other are collected and output as a unit of semantic analysis (see Japanese Patent No. 3363283 (corresponding U.S. Pat. No. 5,884,249)), a method in which a delay in the result of the recognition of input data is taken into consideration (see Japanese Patent Laid-Open No. 10-198544), a method in which the intention of the user is detected by statistical learning (see Japanese Patent Laid-Open No. 11-288342 and Japanese Patent Laid-Open No. 2001-100878), a method using a method of grammatical analysis (see Japanese Patent Laid-Open No. 6-282569), a method in which a linguistic analysis is performed to use a semantic structure (see Japanese Patent Laid-Open No. 2000-231427), and a method in which pointing inputs from a pointing device, such as a mouse, are registered in a list, the number of referring expressions in speech input data is compared with the number of pointing inputs in the list, and if the number of the pointing inputs is smaller than that of the referring expressions in speech input data, the number of pointing inputs is adjusted by obtaining the subsequent pointing input, thus integrating a speech input and a pointing input (see Japanese Patent Laid-Open No. 7-110734).

In the known examples described above where the input time of each input or the order of inputs are taken into consideration, complex processing must be performed to analyze a plurality of candidates for an input result. Moreover, although the above-described examples are based on the premise that speech inputs can be accurately recognized, it is difficult, under the current speech recognition technologies, to achieve recognition with perfect accuracy. Therefore, solutions to the problem of false recognition are important. However, in the known examples described above, there is no description about a solution in case of false recognition or a method for the reduction of false recognition rate.

Japanese Patent Laid-Open No. 7-110734 discloses a technique in which the integration is made pending the subsequent pointing input if the number of pointing inputs is smaller than that of referring expressions in speech input data. Similarly to the examples described above, this technique is based on the premise that the number of referring expressions in speech input data are accurately recognized. Moreover, there is no description of false recognition or a method for the reduction of false recognition rate. In the technique disclosed in Japanese Patent Laid-Open No. 7-110734, if the number of pointing inputs is larger than that of referring expressions in speech input data, error processing is executed and reentry of information is required. Since the reentry of information puts a burden on the user, a technique for preventing such problems needs to be developed.

The present invention has been made in view of the circumstances described above, and is directed to the improvement of accuracy in recognizing instructions indicated by input from at least two input sources.

SUMMARY OF THE INVENTION

To solve the problems described above, the present invention provides a multimodal input method including a receiving step of receiving input information input from at least two input sources; a control step of controlling recognition of input information from a second input source based on the number of inputs from a first input source; and an output step of outputting a recognition result obtained under the control of the control step.

The present invention also provides a multimodal input apparatus including a receiving unit configured to receive information input from at least two input sources; a control unit configured to control recognition of input information from a second input source based on a number of inputs from a first input source; and an output unit configured to output a result of the recognition performed under the control of the control unit.

Further features of the present invention will become apparent from the following description of exemplary embodiments with reference to the attached drawings.

DESCRIPTION OF THE EMBODIMENTS

Embodiments of a multimodal input method according to the present invention will now be described with reference to the drawings.

First Embodiment

Figure 1:
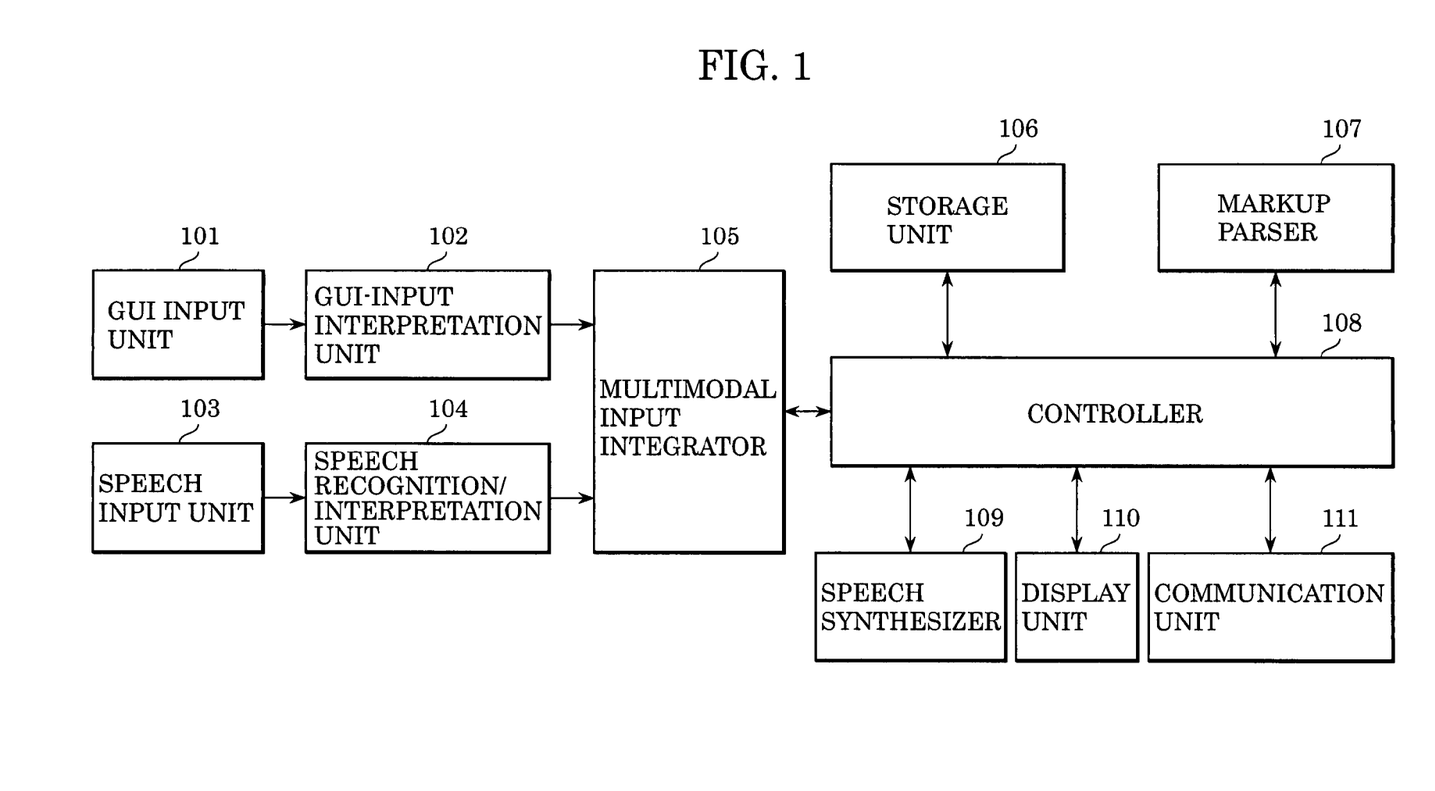
FIG. 1 shows the basic structure of an information processing system according to a first embodiment of the present invention.

FIG. 1 shows the basic structure of a system according to the first embodiment of the present invention. A system accepting speech input and GUI input will be described as an example. The system includes a GUI input unit 101, a GUI-input interpretation unit 102, a speech input unit 103, a speech recognition/interpretation unit 104, a multimodal input integrator 105, a storage unit 106, a markup language parser 107, a controller 108, a speech synthesizer 109, a display unit 110, and a communication unit 111.

Examples of the GUI input unit 101 include one or more of a group of buttons, a keyboard, a mouse, a touch panel, a pen, and a tablet to be used for giving instructions on the GUI. The GUI input unit 101 serves as an input interface for the entry of various instructions into the system. The system receives input information from these input devices. The GUI-input interpretation unit 102 interprets the information entered in the GUI input unit 101. A known technique, such as a handwriting recognition technique, is used in the interpretation.

The speech input unit 103 includes a microphone and an analog-to-digital (A/D) converter, and is used to input the user's speech. The speech recognition/interpretation unit 104 performs speech recognition, through the use of a known technique, on the speech information input in the speech input unit 103. The multimodal input integrator 105 integrates the information interpreted in the GUI-input interpretation unit 102 and the speech recognition/interpretation unit 104.

The storage unit 106 is, for example, a hard disk drive unit for storing various kinds of information, and a storage medium, such as a compact disk-read-only memory (CD-ROM) and a digital versatile disk-ROM (DVD-ROM), for providing the system with various kinds of information. Various application programs, user-interface control programs, and data necessary for executing each program are stored in the hard disk drive unit and the storage medium, and are read, under the control of the controller 108 described below, into the system. The markup language parser 107 parses documents written in a markup language. The controller 108 is, for example, one or a combination of a work memory, a central processing unit (CPU), and a micro-processing unit (MPU), and reads programs and data stored in the storage unit 106 to execute various processing. In addition, the controller 108 controls the GUI-input interpretation unit 102, the speech recognition/interpretation unit 104, and the multimodal input integrator 105.

The speech synthesizer 109 includes a speaker, a headphone, and a digital-to-analog (D/A) converter. The speech synthesizer 109, under the control of the controller 108, generates audio data based on text to be read, converts the audio data from digital to analog, and outputs the converted data as sound. A known speech synthesis technique is used here. The display unit 110 is a display device, such as a liquid crystal display, and displays various information including images and text. The display unit 110 may be a touch-screen display. In this case, the display unit 110 also serves as the GUI input unit 101 that performs the function of inputting various instructions into the system. The communication unit 111 is a network interface allowing data communication with other devices via a network, such as the Internet or a LAN (local area network).

An integration method in the multimodal input integrator 105 will now be described with reference to the flowchart in FIG. 2. Upon receipt of information interpreted in the GUI-input interpretation unit 102 and the speech recognition/interpretation unit 104, in other words, upon receipt of recognition candidates, the multimodal input integrator 105 outputs the result of interpretation showing "integration=0" in the GUI input (step S201). The "integration" variable indicates whether or not it is necessary to integrate with the result of input from the other input source. If integration is necessary, "1" is input in the GUI-input interpretation unit 102 and the speech recognition/interpretation unit 104. On the other hand, if integration is not necessary, "0" is input in the GUI-input interpretation unit 102 and the speech recognition/interpretation unit 104. The determination as to whether or not it is necessary to integrate with the result of input from another input source is made using a known technique, such as a technique based on whether or not the location for storing the value has been set.

If all the results of speech recognition and interpretation give "integration"=0 (YES in step S202), the first-ranked result of the speech recognition and interpretation is output (step S203) and the process is terminated. If there are any results that give "integration"=1 (NO in step S202), the number NUM of "integration"=1 in GUI inputs within a speech input time T is counted (step S204). The speech input time T is, as shown in a graph 301 in FIG. 3 (vertical axis: power of speech input, horizontal axis: time), a time period during which power exceeding a threshold value "th" is detected. Alternatively, as shown in a graph 302 in FIG. 3, the speech input period T may be a time period set in the speech input unit 103, such as a time period obtained by adding a predetermined time period (such as several seconds) to each end of a time period during which power exceeding a threshold value "th" is detected. In the graph 301 in FIG. 3, NUM=2 is obtained if all GUI inputs give "integration"=1.

If NUM=0 (YES in step S205), it is determined whether there are any results of speech recognition and interpretation that give "integration"=0 (step S206). If such results exist (YES in step S206), the result with the highest degree of certainty among the results of speech recognition and interpretation that give "integration"=0 is output (step S207) and the process is terminated. If there is no such result (NO in step S206), an error message indicating the failure of integration is output (step S208) and the process is terminated.

If NUM=0 is not given (NO in step S205), one is assigned to N (step S209) and the process proceeds to step S210. If there is no Nth-ranked (initially, the first-ranked) result of speech recognition and interpretation (NO in step S210), an error message indicating the failure of integration is output (step S208) and the process is terminated. If the Nth-ranked result exists (YES in step S210), the process proceeds to step S211. In step S211, it is determined whether or not the Nth-ranked result of speech recognition and interpretation gives "integration"=1 (that is, whether or not integration is necessary). If integration is not necessary (NO in step S211), one is added to N (step S212) and the process proceeds to step S210. If integration is necessary (YES in step S211), it is determined whether or not the number of "?" is equal to NUM (in an example shown in FIG. 4, a value of "unknown" in each of tables 401 to 403) (step S213). If the number of "?" is not equal to NUM (NO in step S213), one is added to N (step S212) and the process proceeds to step S210. If the number of "?" is equal to NUM (YES in step S213), the Nth-ranked result of speech recognition and interpretation is integrated with the result of GUI interpretation and is output (step S214). For example, a speech input "From here" is integrated with a GUI input "Ebisu" to produce a result "From Ebisu". Processing then ends.

The following show examples of the above-described multimodal input integration with reference to the drawings. FIGS. 4 to 7 show the flow of interpretation of speech and button input.

Figure 4:
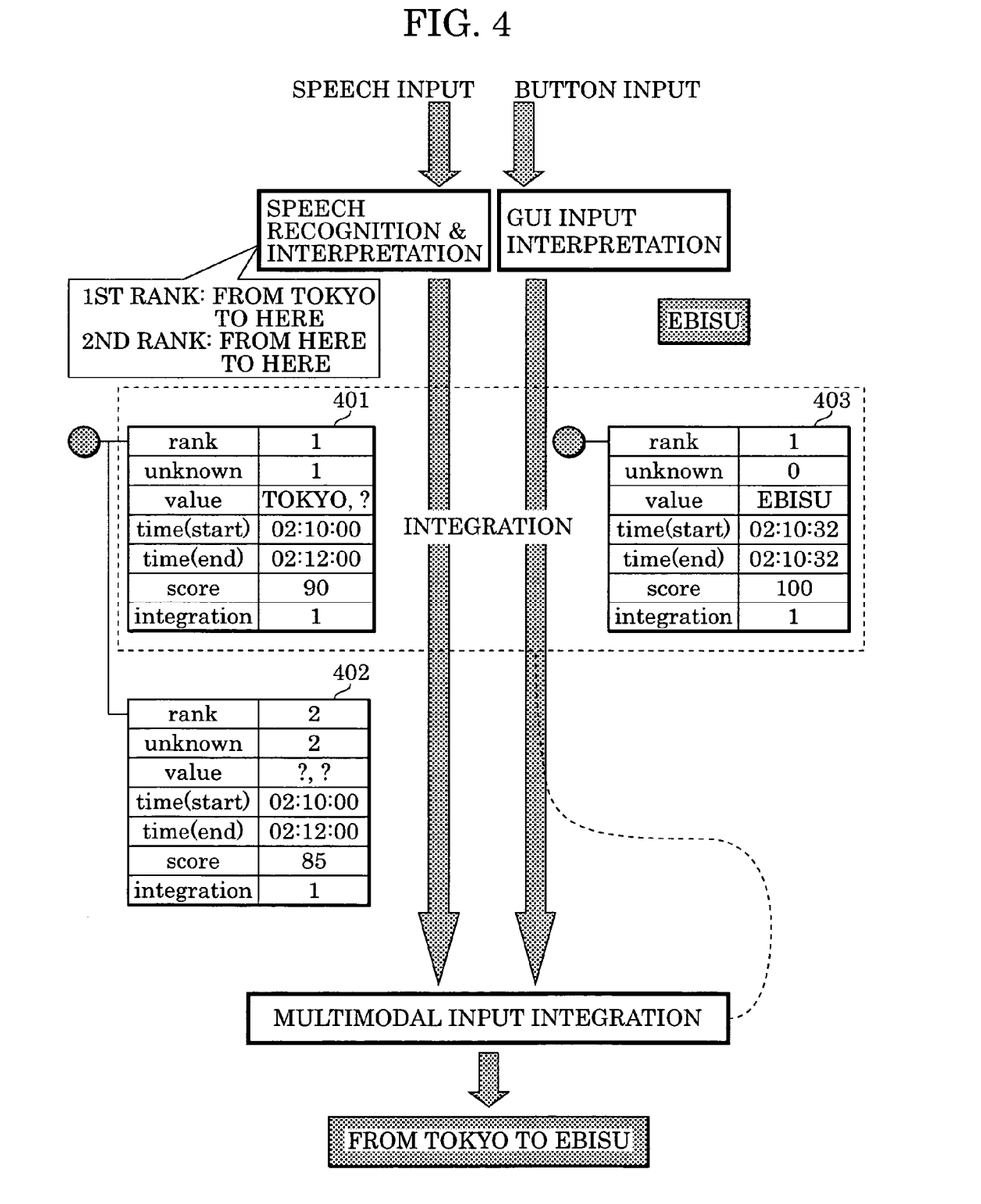
FIG. 4 shows an example of multimodal input integration in the information processing system according to the first embodiment of the present invention.

A first example will now be described with reference to FIG. 4. A speech recognition/interpretation result 401 and a speech recognition/interpretation result 402 are results having the highest certainty and the second highest certainty, respectively. A GUI-input interpretation result 403 shows the interpretation of button input, and only the result with the highest certainty is obtained in this example.

Items in each of the results 401 to 403 are: "rank" indicating the ranking of certainty ("1", "2", . . . in descending order of certainty, i.e., "1" is the highest level of certainty), "unknown" indicating the number of uncertain values ("value=?" described below), "value" indicating an interpreted value, "time (start)" indicating the input start time, "time (end)" indicating the input end time, "score" indicating the degree of certainty, and "integration" indicating whether or not integration is necessary ("1"=necessary, "0"=not necessary). The results of interpretation in the GUI-input interpretation unit 102 and the speech recognition/interpretation unit 104 are input to the tables (401 to 403) described above and transmitted to the multimodal input integrator 105. If the results in the tables are described in XML, the markup language parser 107 parses the results.

Figure 2:
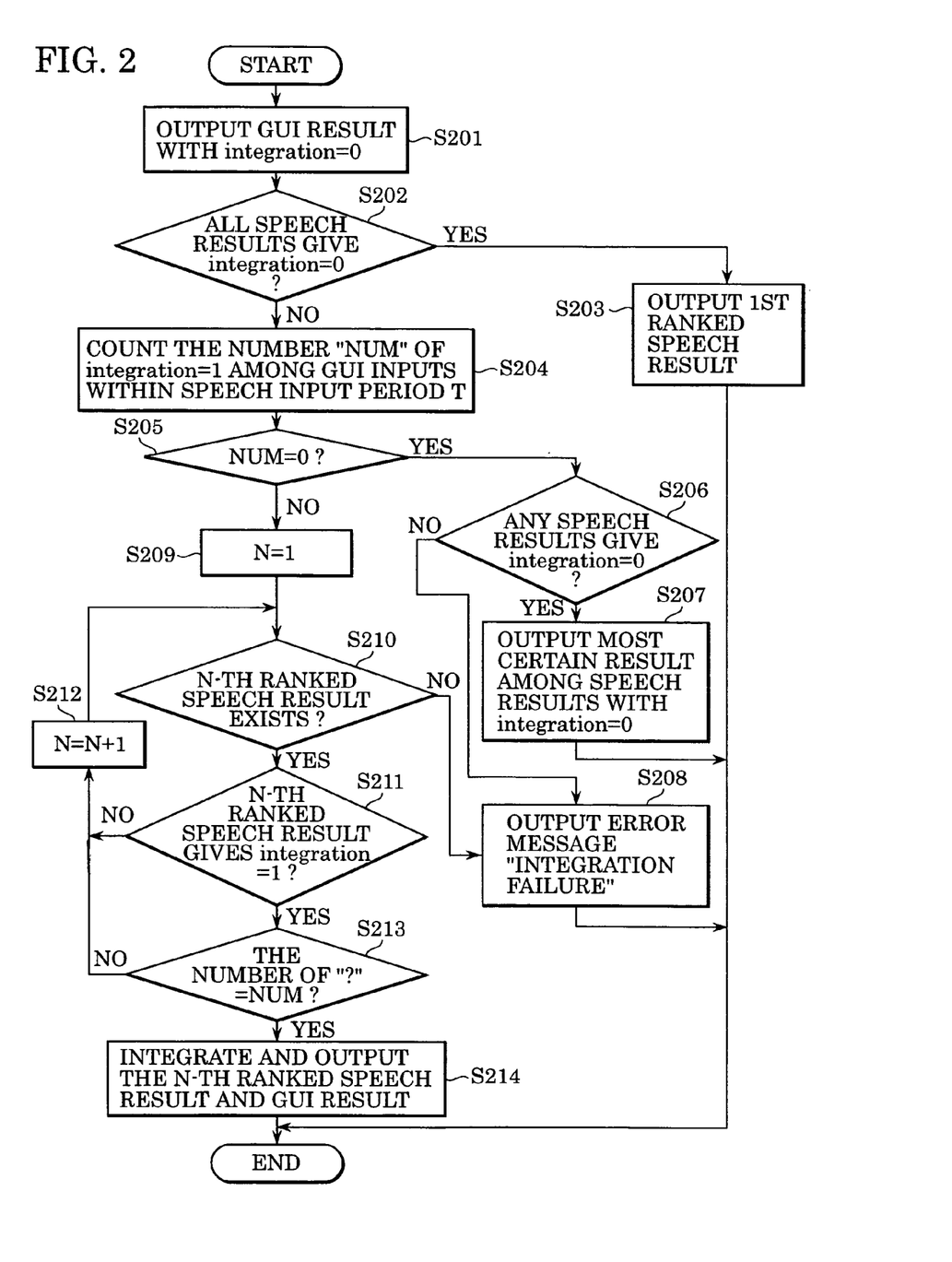
FIG. 2 is a flowchart showing the processing of a multimodal input integrator in the information processing system according to the first embodiment of the present invention.
Figure 3:
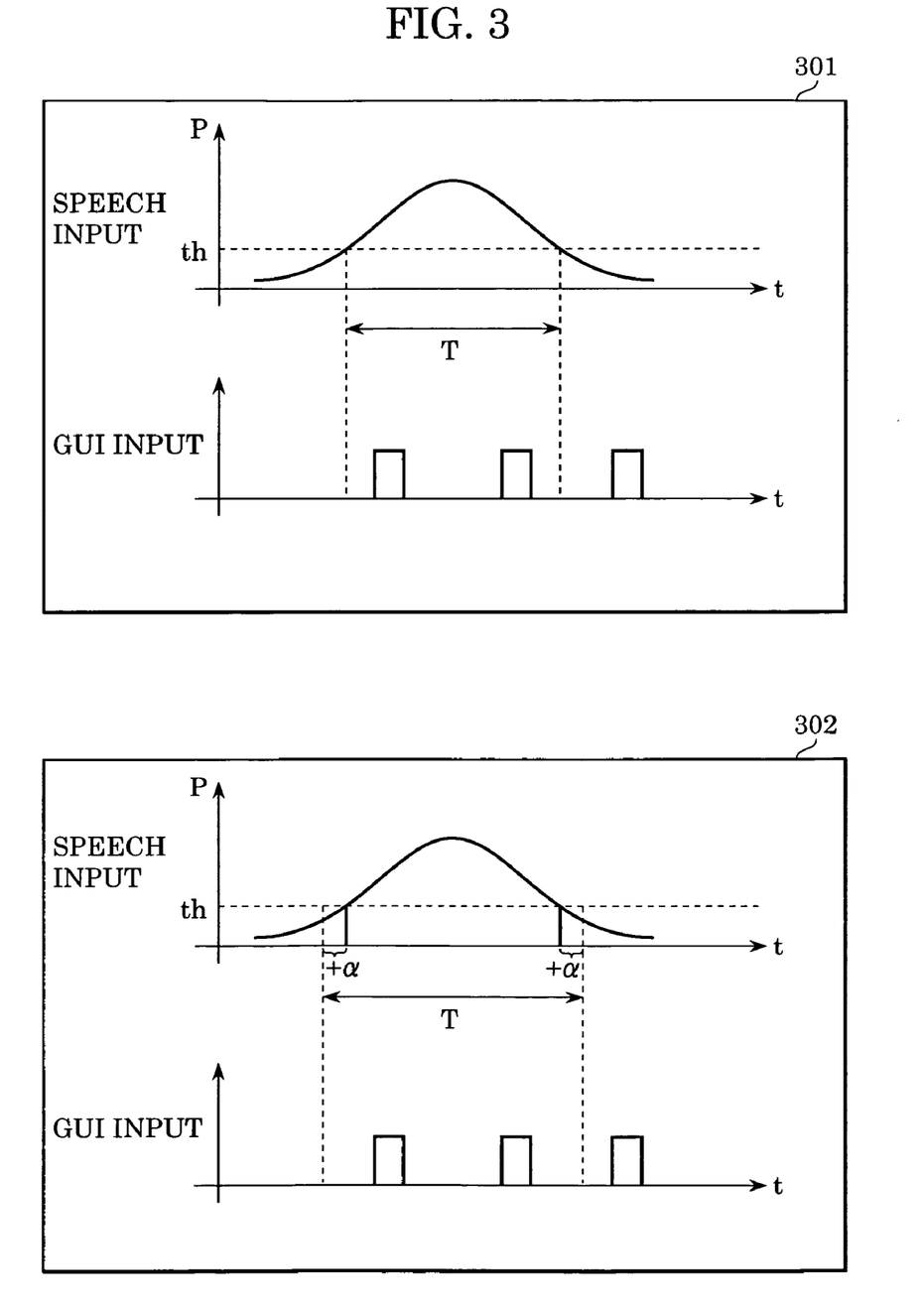
FIG. 3 shows inputs according to the first embodiment of the present invention.

The multimodal input integrator 105 performs processing according to the flow in FIG. 2. Since the GUI-input interpretation result 403 is obtained from the input during the speech input time T (02:10:00 to 02:12:00) and gives "integration"=1, NUM=1 is obtained in step S204 and N=1 is set in step S209. Since the first-ranked speech recognition/interpretation result 401 exists (YES in step S210), the process proceeds to step S211. Then, since it is determined that "integration"=1 (YES in step S211) and "unknown"=1=NUM (YES in step S213), the process proceeds to step S214. In step S214, the interpretation of a speech input "From Tokyo to here" and the interpretation of a button input "Ebisu" are integrated and outputted as "From Tokyo to Ebisu".

Figure 5:
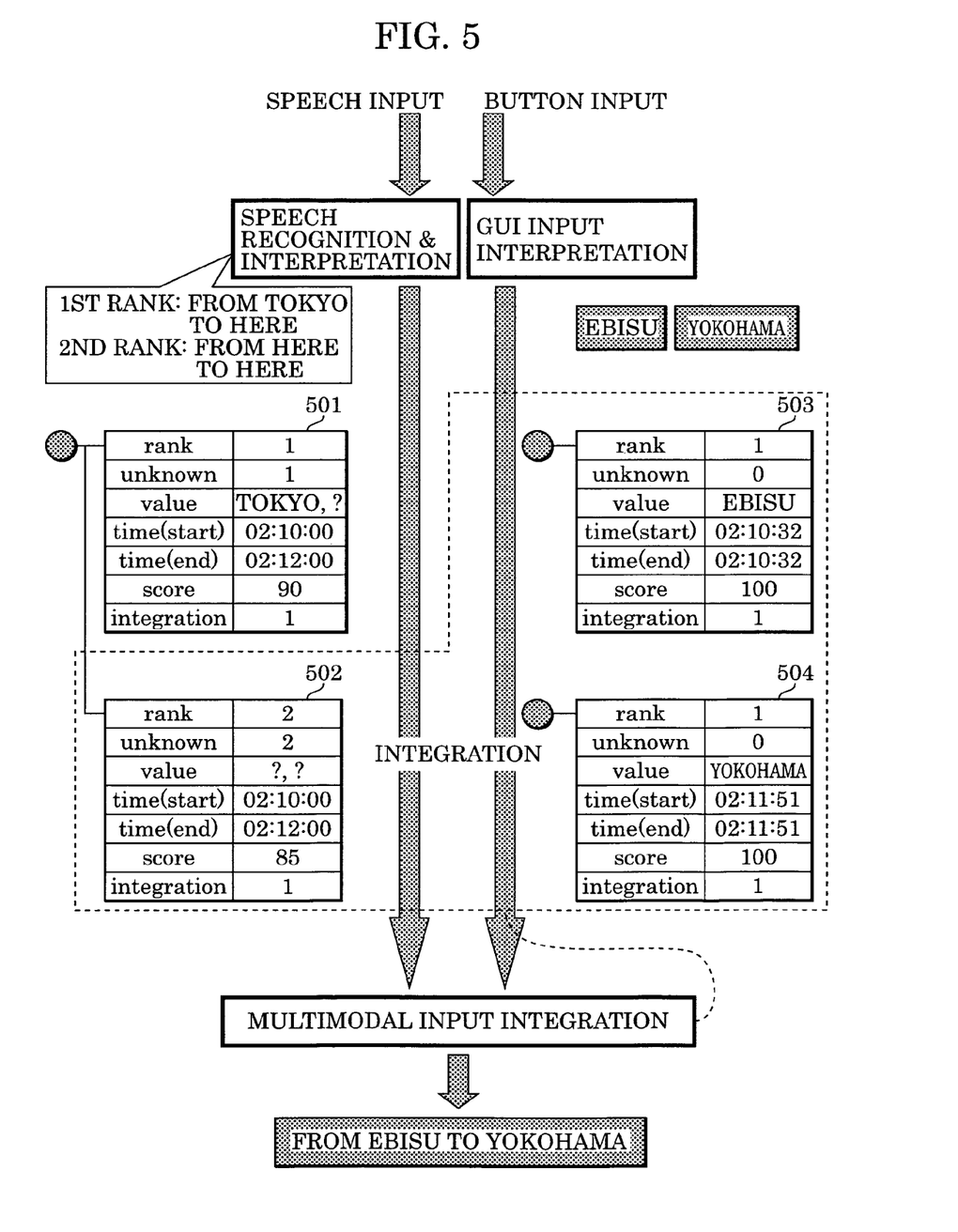
FIG. 5 shows another example of multimodal input integration in the information processing system according to the first embodiment of the present invention.

Similarly, in an example shown in FIG. 5, GUI-input interpretation results 503 and 504 give NUM=2 (step S204). Since the first-ranked speech recognition/interpretation result 501 gives "unknown"=1, which is not equal to NUM=2 (NO in step S213), the second-ranked speech recognition/interpretation result 502 is subsequently examined. Then "unknown"=2=NUM (YES in step S213) is determined from the speech recognition/interpretation result 502. Thus, in step S214, the interpretation of speech input "From here to here" is integrated with the interpretation of button input "Ebisu" and "Yokohama" and outputted as "From Ebisu to Yokohama".

Figure 6:
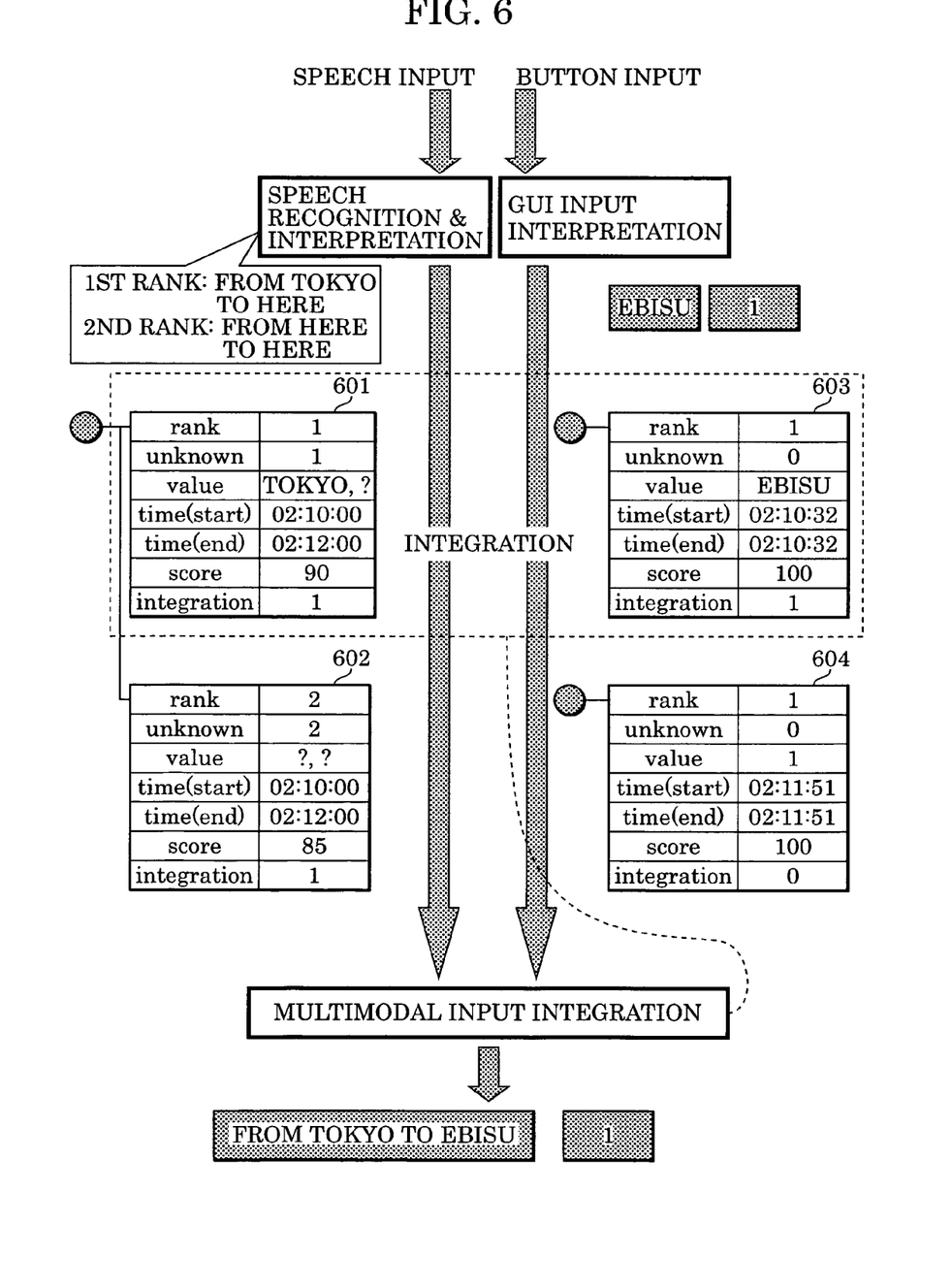
FIG. 6 shows another example of multimodal input integration in the information processing system according to the first embodiment of the present invention.

In an example shown in FIG. 6, since a GUI-input interpretation result 604 gives "integration"=0, "1" is outputted as the interpretation of button input. Moreover, NUM=1 is determined from a GUI-input interpretation result 603 (step S204). Then "unknown"=1=NUM (YES in step S213) is determined from a speech recognition/interpretation result 601. Thus, in step S214, the interpretation of speech input "From Tokyo to here" and the interpretation of button input "Ebisu" are integrated and outputted as "From Tokyo to Ebisu".

Figure 7:
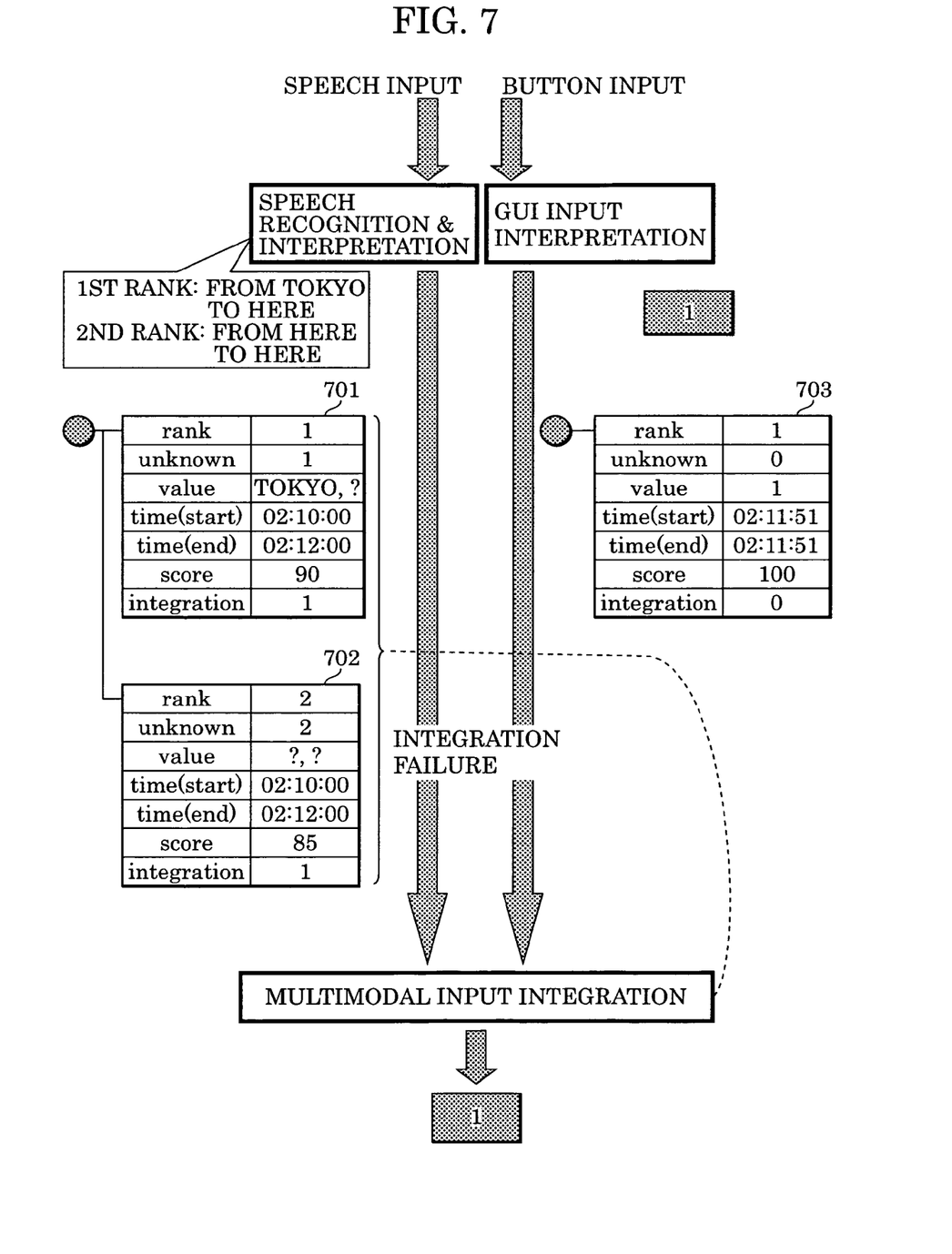
FIG. 7 shows another example of multimodal input integration in the information processing system according to the first embodiment of the present invention.

In an example shown in FIG. 7, since a GUI-input interpretation result 703 gives "integration"=0, "1" is output as the interpretation of button input, and NUM=0 is determined (step S204). Since speech recognition/interpretation results 701 and 702 do not give "integration"=0 (NO in step S206), an error message indicating the failure of integration is output (step S208) and the process is terminated.

As described above, in the first embodiment, a speech recognition/interpretation result is selected based on the number of button inputs within a speech input time. Priorities can thus be assigned to candidates generated from the speech recognition, and the accuracy of the recognition can be improved. This increases the possibility that a correct recognition result can be output from a plurality of candidates, and saves the user from having to reenter information.

Second Embodiment

An information processing system according to the second embodiment of the present invention will now be described. The examples of the first embodiment show the cases where the recognition rate is 100% since buttons are used for GUI input. However, in actual multimodal user interfaces, there are cases where the certainty of interpretation of each input to be integrated is not 100%. In such cases, similar processing to that in the first embodiment can be performed in order of certainty, beginning with the first-ranked interpretation result.

Figure 8:
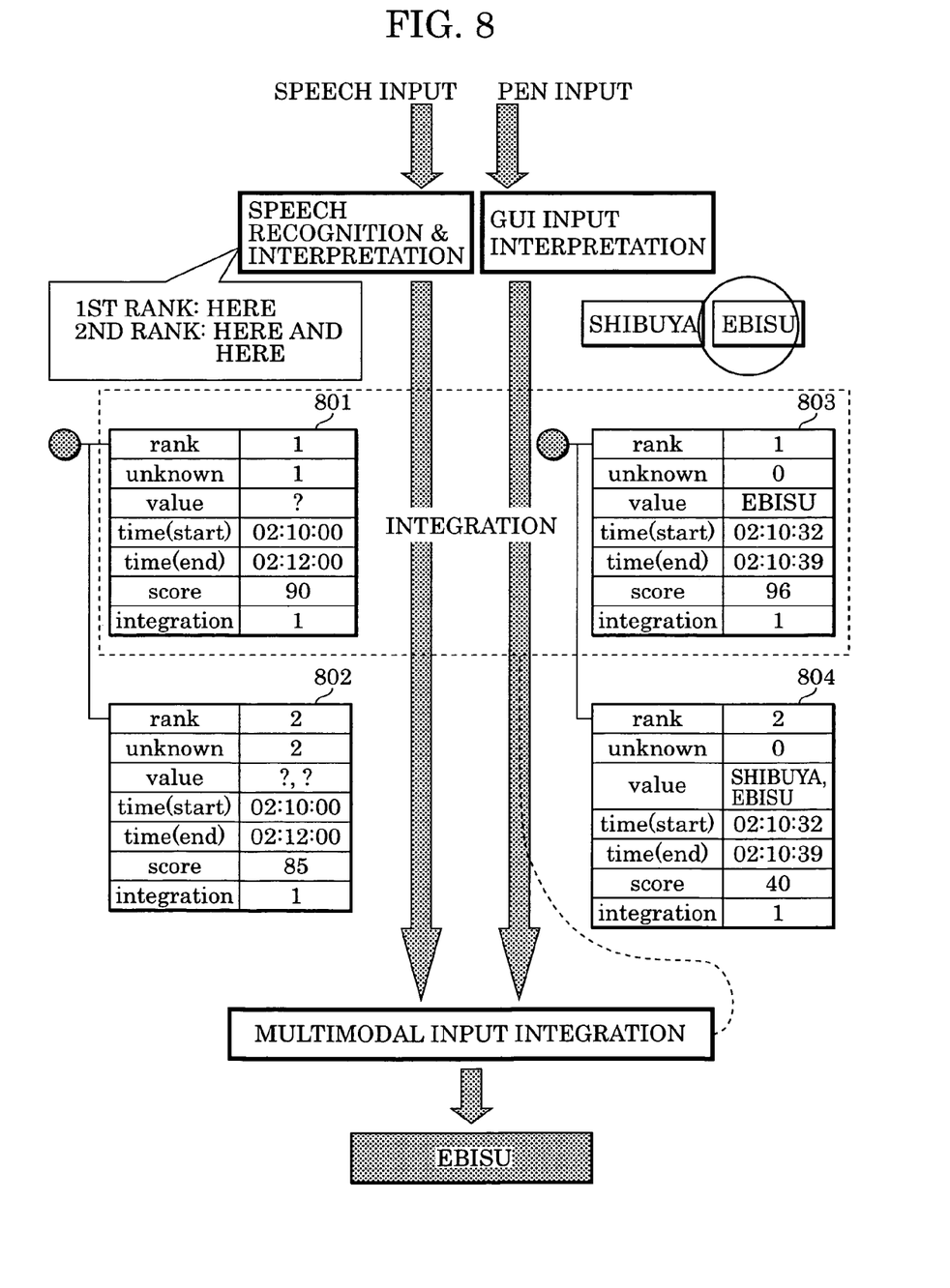
FIG. 8 shows an example of multimodal input integration in the information processing system according to a second embodiment of the present invention.

In the present embodiment, examples where speech input and pen input are performed will be described with reference to FIGS. 8 to 10. In FIG. 8, items in each of tables (801 to 804) are the same as those in FIGS. 4 to 7 described above. FIG. 8 shows the first-ranked speech recognition/interpretation result 801, the second-ranked speech recognition/interpretation result 802, the first-ranked GUI-input interpretation result 803, and the second-ranked GUI-input interpretation result 804.

Similar processing to that in the first embodiment will be performed in order of certainty, beginning with the first-ranked GUI-input interpretation result 803. The first-ranked GUI-input interpretation result 803 is obtained from the input during the speech input time T (02:10:00 to 02:12:00) and gives "integration"=1. Since the number of "value" in the GUI-input interpretation result 803 is one, NUM=1 is obtained in step S204 and N=1 is set in step S209. Since the first-ranked speech recognition/interpretation result 801 exists (YES in step S210), the process proceeds to step S211. Then, since it is determined that "integration"=1 (YES in step S211) and "unknown"=1=NUM (YES in step S213), the process proceeds to step S214. In step S214, the interpretation of a speech input "Here" and the interpretation of a pen input "Ebisu" are integrated and outputted as "Ebisu".

Figure 9:
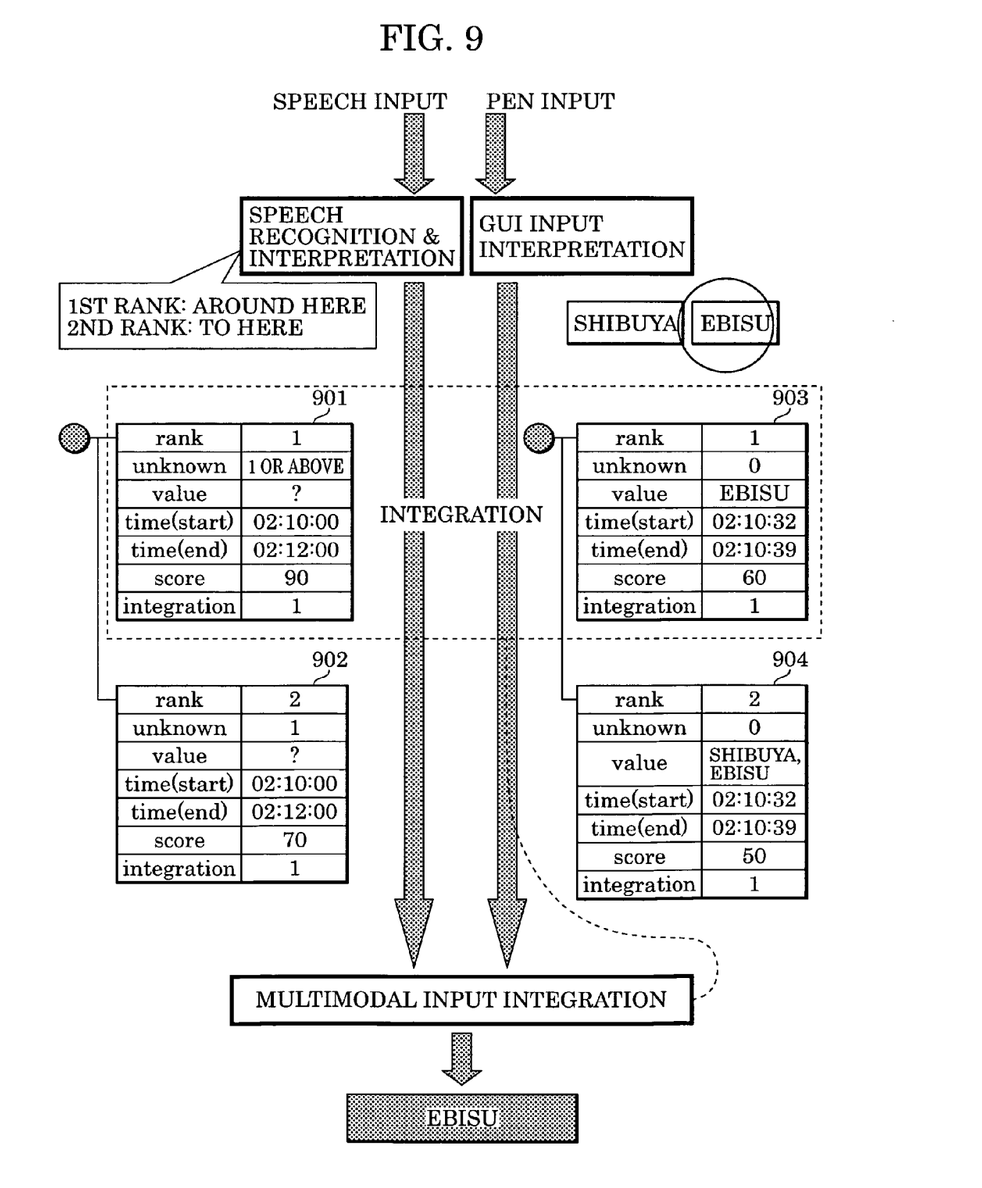
FIG. 9 shows another example of multimodal input integration in the information processing system according to the second embodiment of the present invention.

In an example shown in FIG. 9, a GUI-input interpretation result 903 gives NUM=1 (step S204). The first-ranked speech recognition/interpretation result 901 gives "unknown"=1 or above that matches NUM (YES in step S213). Thus, in step S214, the interpretation of a speech input "Around here" and the interpretation of a pen input "Ebisu" are integrated and outputted as "Ebisu".

Figure 10:
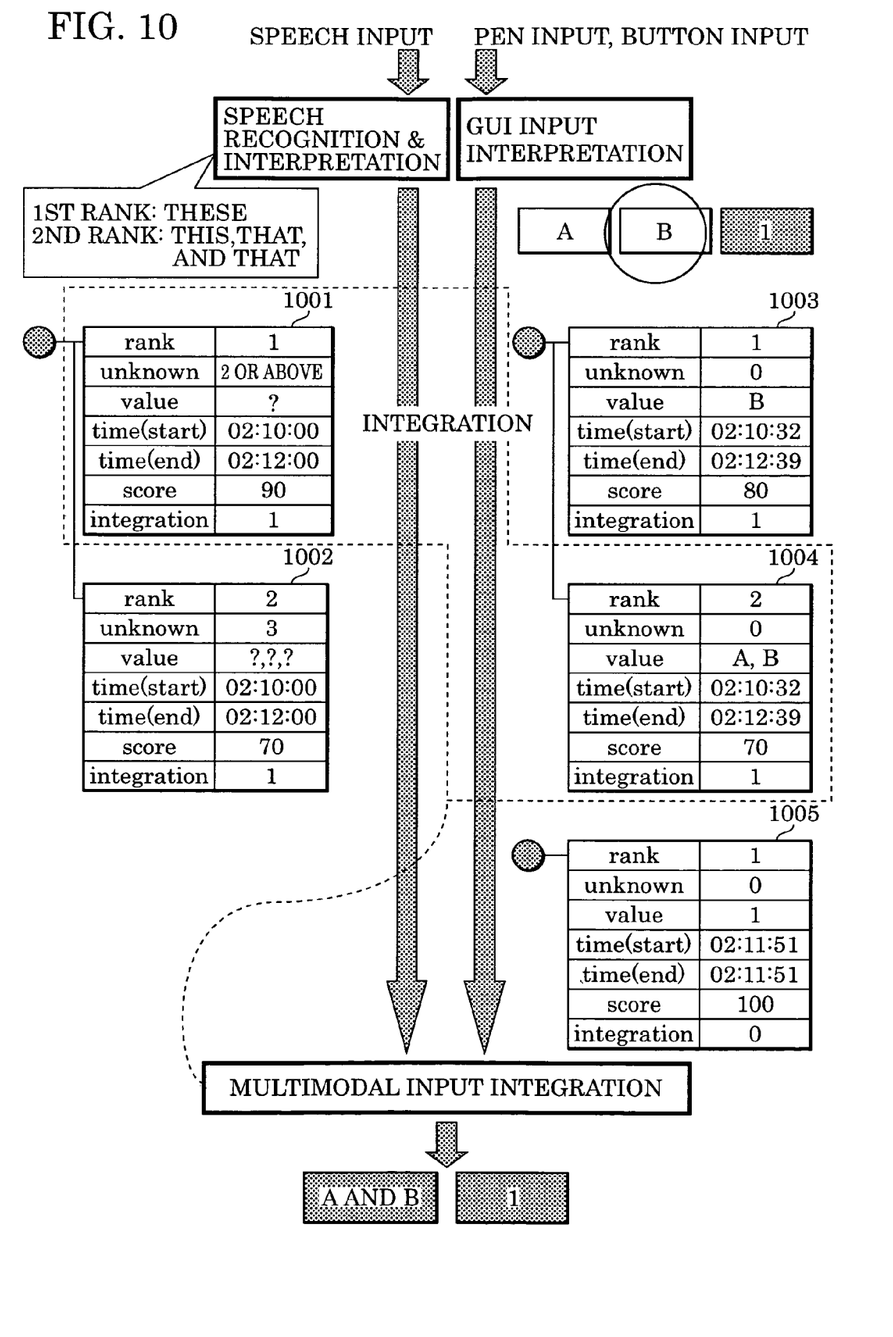
FIG. 10 shows another example of multimodal input integration in the information processing system according to the second embodiment of the present invention.

FIG. 10 shows an example where both pen input and button input are performed as GUI input. Since a GUI-input interpretation result 1005 gives "integration"=0, "1" is outputted as the interpretation of the button input. The first-ranked GUI-input interpretation result 1003 gives NUM=1 (step S204). Since the first-ranked speech recognition/interpretation result 1001 gives "unknown"=2 or above that does not match NUM (NO in step S213), the second-ranked speech recognition/interpretation result 1002 is subsequently examined. Since the second-ranked speech recognition/interpretation result 1002 gives "unknown"=3 that does not match NUM (NO in step S213), the integration cannot be performed. Next, NUM=2 is obtained from the second-ranked GUI-input interpretation result 1004 (step S204). The first-ranked speech recognition/interpretation result 1001 gives "unknown"=2 or above that matches NUM (YES in step S213). Thus, in step S214, the interpretation of the speech input "These" and the interpretation of the pen input "A, B" are integrated and outputted as "A and B".

As described above, in the second embodiment, even if the certainty of the interpretation of each input to be integrated is not 100%, the accuracy of the interpretation of the result of speech recognition can be improved by selecting a speech recognition/interpretation result based on the number of GUI inputs within a speech input time.

Third Embodiment

Although the examples of the above-described embodiments show the cases where GUI input is accepted, the present invention is not limited to such cases and may be configured such that physical key input from, for example, a keyboard or a numeric keypad can be accepted. An example described here is a copier that is operable with a numeric keypad and speech input. The description is based on the premise that instruction commands are assigned to respective keys on a numeric keypad on the copier as follows: Key 1: paper selection, Key 2: number of copies, Key 3: scaling, Key 4: density, Key 5: duplex printing, Key 6: sort, Key 7: staple sort, and Key 8: advanced mode.

If the user wants to make 5 copies of 10 pages of an A5-sized document and staple each copy in the upper left corner, the user can make the settings by saying "A5" while holding down Key 1 (or by saying "A5" after clicking Key 1), saying "5 copies" while holding down Key 2 (or by saying "5 copies" after clicking Key 2), and saying "upper left" while holding down Key 7 (or by saying "upper left" after clicking Key 7). To repeat the same operation, it is better for efficiency to say successively as "A5, 5 copies, upper left" rather than inputting them one by one. However, since the accuracy of speech recognition is not 100% under the current technology, recognition errors, such as "5 sheets, upper left" and "A5, 5 copies, upper left, darken" may frequently occur and generate incorrect candidates.

In the present embodiment, in such a case, speech input and key input are integrated based on the number of key inputs. The user says "A5, 5 copies, upper left" while holding down Keys 1, 2, and 7 (or after clicking Keys 1, 2 and 7). The three keys may be pressed either simultaneously or sequentially. Here, the number of key inputs, which is three, is compared with the number of speech inputs. For example, the ranking of speech recognition candidates is as follows: (1) "5 copies, upper left", (2) "A5, 5 copies, upper left", (3) "A5, 5 copies, upper left, darken" and (4) "A2, 50 copies, upper left". The recognition candidates are narrowed down to the first-ranked "A5, 5 copies, upper left" and the second-ranked "A2, 50 copies, upper left" by eliminating candidates, such as "5 copies, upper left" and "A5, 5 copies, upper left, darken" that do not match the number of key inputs, or by selecting candidates, such as "A5, 5 copies, upper left" and "A2, 50 copies, upper left" that match the number of key inputs. Thus, a recognition candidate with the highest likelihood is selected as a recognition result, and "A5, 5 copies, upper left" that the user has said is correctly recognized.

Moreover, the present invention is also applicable to the case where, if numbered menu items on a cell-phone screen can be selected with buttons, the user says, for example, "Show me the help information for this and this" while holding down buttons 3 and 5.

Fourth Embodiment

The example of the above-described embodiments show the cases where an appropriate candidate is selected from the first to N-th ranked speech recognition/interpretation results based on the number of GUI inputs or physical key inputs. However, the number of input sources from which input should be used to input information is not limited to the examples described above. For example, an appropriate candidate may be selected from the first to N-th ranked handwriting-input recognition results by using the number of inputs (value of "unknown" in the examples described above) obtained from speech recognition/interpretation results. Since button input generally has a higher certainty than that of speech input (recognition), the number of button inputs may be applied to the other modality. However, if every input source has a certain degree of ambiguity, it is not appropriate to simply determine that the number of inputs from which input is to be applied to input information from which input source. In such a case, a modality may be selected every time depending on the certainty. For example, a modality with a larger difference in certainty between the first-ranked candidate and the second-ranked candidate may be selected.

Figure 11:
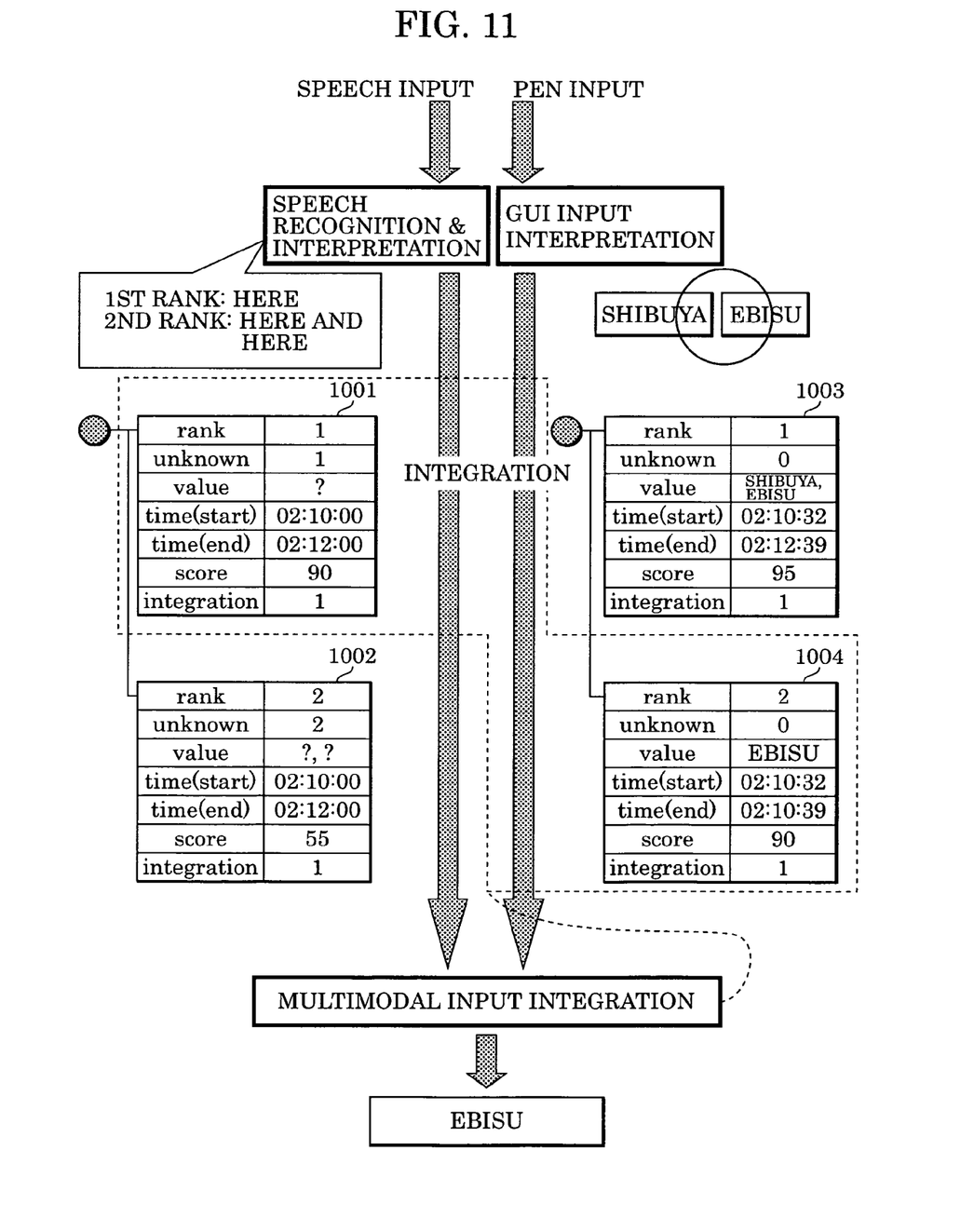
FIG. 11 shows an example of multimodal input integration in the information processing system according to a fourth embodiment of the present invention.

Such an example will now be described with reference to FIG. 11. FIG. 11 shows an example where the user has circled "Ebisu" with a pen while saying "Here". Although the user intended to circle only "Ebisu", a part of the circle is placed over "Shibuya". According to the interpretation of the speech input, the first-ranked "Here" and the second-ranked "Here and here" have "score"=90 and "score"=55, respectively. As for the interpretation of the pen input, the first-ranked "Shibuya, Ebisu" and the second-ranked "Ebisu" have "score"=95 and "score"=90, respectively. Since the difference in certainty between the first-ranked candidate and the second-ranked candidate is larger in the case of the speech input than that in the case of the pen input, and thus it is highly probable that the first-ranked candidate will be the correct one, it is highly probable that the number of speech inputs is correct. That is, because of its higher likelihood of the number of inputs, the number of speech inputs is trusted here. The value of the likelihood of the number of inputs may be determined, as described above, based on the difference in certainty between the first-ranked candidate and the second-ranked candidate. It is also possible to determine that a modality in which the number of commonalities, in terms of the number of inputs, among the top-ranked recognition candidates is larger has the higher value of the likelihood of the number of inputs. For example, even if there is a large difference in certainty between the first-ranked candidate and the second-ranked candidate, the likelihood value decreases if the number of inputs is different between them. It is also possible to determine such that, even if there are only small differences in certainty among the first to fourth-ranked candidates, the likelihood value increases if all the candidates have the same number of inputs. As described above, the likelihood value may be determined using information, such as "button input generally has a higher certainty than that of speech input (recognition)". In the example in FIG. 11, since the number of inputs in the first-ranked candidate for speech input is one, the second-ranked candidate for GUI input is selected, as its number of inputs is one. Thus, "Here" and "Ebisu" are integrated to output the result "Ebisu".

Fifth Embodiment

Although the above-described embodiments show the cases in which the number of inputs is obtained from one of input source, the present invention is not limited to such cases. For example, in a copier that allows both GUI input and key input, the number of inputs from both of these sources can be taken into consideration. For example, the user selects a paper size and "duplex printing" on the GUI and enters "10" by key input while saying "B5, single to double side copying, this number of copies". In this case, the number of speech inputs is three, and the total number of GUI and key inputs is three. By eliminating speech recognition candidates having the number of inputs that is not equal to three, the recognition accuracy can be improved.

Sixth Embodiment

Although the examples of the above-described embodiments show the integration of speech input with other input sources, the present invention is not limited to this. For example, the present invention is applicable to multimodal input that allows gesture input and gaze input. For example, it is assumed that the user selects an object by gaze input and gives Instructions to the object by gesture input. The object is considered to be selected if, for example, being stared at for a long period of time. However, a plurality of candidates for the object may be obtained if the recognition cannot be properly performed. In such a case, if two instructions are given by gesture input, it is highly likely that the number of objects to be handled is two. Therefore, by eliminating gaze recognition candidates not having two objects to be handled, the accuracy in recognition can be improved.

In the present invention, a storage medium (or recording medium) on which a software program code for performing the functions of the above-described embodiments is recorded may be supplied to a system or apparatus such that a computer (or central processing unit (CPU) or micro-processing unit (MPU)), that is, the system or apparatus reads out and executes the program code stored in the storage medium.

In this case, the program code read out from the storage medium performs the functions of the above-described embodiments.

The storage medium for supplying the program code may be, for example, a flexible disk, a hard disk, an optical disk, a magneto-optical disk, a compact disk-read-only memory (CD-ROM), a CD-recordable (CD-R), a magnetic tape, a non-volatile memory card, and a ROM.

The functions of the above-described embodiments can be performed not only by a computer reading and executing the program code, but also by an operating system (OS) running on the computer and executing a whole or part of the actual processing in accordance with instructions of the program code.

The functions of the above-described embodiments can also be performed, after the program code read out from the storage medium is written in a memory of a function expansion board in a computer or is written in a memory of an expansion unit connected to a computer, by a CPU or the like, which is included in the function expansion board or expansion unit, executing a whole or part of the actual processing in accordance with instructions of the program code.

While the present invention has been described with reference to exemplary embodiments, it is to be understood that the invention is not limited to the disclosed embodiments. The scope of the following claims is to be accorded the broadest interpretation so as to encompass all modifications, equivalent structures and functions.

This application claims priority from Japanese Patent Application No. 2004-191632 filed Jun. 29, 2004, and Japanese Patent Application No. 2004-379948 filed Dec. 28, 2004, which are hereby incorporated by reference herein in their entirety.

What is claimed is:

1. A multimodal input method comprising:
   a receiving step of receiving first input information acquired by a speech input source during a speech input period and second input information indicating at least one pointed item acquired by a pointing input source during the speech input period:
   a speech recognition step of recognizing a plurality of recognition candidates based on the first input information;
   a determining step of determining whether the number of unknown items included in a respective recognition candidate is equal to the number of the pointed items acquired by the pointing input source;
   if it is determined in the determining step that the number unknown items included in the respective recognition candidate is not equal to the number of the pointed items acquired by the pointing input source, repeating the determining step with a different respective recognition candidate in order to obtain a matching recognition candidate which is a respective recognition candidate whose number of unknown items is equal to the number of the at least one pointed items; and
   an output step of outputting a recognition result in which the at least one unknown item included in the matching recognition candidate is replaced with the at least one pointed item acquired by the pointing input source.

2. The multimodal input method according to claim 1, wherein the number of inputs is a quantity of inputs or a frequency of input from each input source.

3. The multimodal input method according to claim 1, wherein in the determining step and repeating the determining step, the respective recognition candidate is selected based on a likelihood recognition value in order from a highest likelihood value to a lowest likelihood value.

4. A computer-readable medium having stored thereon a control program for causing a computer to execute a multimodal input method comprising:
   a receiving step of receiving first input information acquired by a speech input source during a speech input period and second input information indicating at least one pointed item acquired by a pointing input source during the speech input period;
   a speech recognition step of recognizing a plurality of recognition candidates based on the first input information;
   a determining step of determining whether the number of unknown items included in a respective recognition candidate is equal to the number of the pointed items acquired by the pointing input source;
   if it is determined in the determining step that the number unknown items included in the respective recognition candidate is not equal to the number of the pointed items acquired by the pointing input source, repeating the determining step with a different respective recognition candidate in order to obtain a matching recognition candidate which is a respective recognition candidate whose number of unknown items is equal to the number of the at least one pointed items; and an output step of outputting a recognition result in which the at least one unknown item included in the matching recognition candidate is replaced with the at least one pointed item acquired by the pointing input source.

5. The computer-readable medium according to claim 4,
wherein in the determining step and repeating the determining step, the respective recognition candidate is selected based on a likelihood recognition value in order from a highest likelihood value to a lowest likelihood value.

6. A multimodal input apparatus comprising:

a receiving unit configured to receive first input information acquired by a speech input source during a speech input period and second input information indicating at least one pointed item acquired by a pointing input source during the speech input period;

a speech recognition unit configured to recognize a plurality of recognition candidates based on the first input information;

a determining unit configured to determine whether the number of unknown items included in a respective recognition candidate is equal to the number of the pointed items acquired by the pointing input source;

a control unit configured to control the determining unit to repeat the determining with a different respective recognition candidate in order to obtain a matching recognition candidate which is a respective recognition candidate whose number of unknown items is equal to the number of the at least one pointed items if it is determined that the number unknown items included in the respective recognition candidate is not equal to the number of the pointed items acquired by the pointing input source; and an output unit configured to output a result of the recognition in which the unknown item included in the matching recognition candidate obtained in the obtaining step is replaced with the pointed item acquired by the pointing input source.

7. The multimodal input apparatus according to claim 6,
wherein the respective recognition candidate used by the determining unit is selected based on a likelihood recognition value in order from a highest likelihood value to a lowest likelihood value.

* * * * *